United States Patent
Lee et al.

(10) Patent No.: US 9,597,964 B2
(45) Date of Patent: Mar. 21, 2017

(54) DEVICE FOR COMPENSATING FOR RIPPLES OF OUTPUT VOLTAGE OF PFC CONVERTER AND BATTERY CHARGING DEVICE FOR ELECTRIC VEHICLE USING SAME

(71) Applicant: MYONGJI UNIVERSITY INDUSTRY AND ACADEMIA COOPERATION FOUNDATION, Gyeonggi-do (KR)

(72) Inventors: Jun-Young Lee, Gyeonggi-do (KR); Gwang-Min Yoo, Seoul (KR); Won-Yong Kim, Gyeonggi-do (KR)

(73) Assignee: Myongji University Industry and Academia Cooperation Foundation, Gyeonggi-do (KR)

( * ) Notice: Subject to any disclaimer, the term of this patent is extended or adjusted under 35 U.S.C. 154(b) by 0 days.

(21) Appl. No.: 14/377,144

(22) PCT Filed: Oct. 30, 2013

(86) PCT No.: PCT/KR2013/009747
§ 371 (c)(1),
(2) Date: Aug. 6, 2014

(87) PCT Pub. No.: WO2014/069900
PCT Pub. Date: May 8, 2014

(65) Prior Publication Data
US 2015/0224885 A1    Aug. 13, 2015

(30) Foreign Application Priority Data

Nov. 1, 2012  (KR) .................... 10-2012-0122866

(51) Int. Cl.
*B60L 11/18*   (2006.01)
*H02M 1/15*    (2006.01)
(Continued)

(52) U.S. Cl.
CPC .......... *B60L 11/1809* (2013.01); *B60L 11/18* (2013.01); *H02M 1/15* (2013.01); *H02M 1/42* (2013.01);
(Continued)

(58) Field of Classification Search
CPC .................................................. H02M 1/4208
See application file for complete search history.

(56) References Cited

U.S. PATENT DOCUMENTS

| 5,907,223 | A | * | 5/1999 | Gu ...................... | H02M 1/4208 315/247 |
| 2007/0036212 | A1 | * | 2/2007 | Leung ................... | H02M 1/42 375/238 |

(Continued)

*Primary Examiner* — Richard Isla Rodas
*Assistant Examiner* — Tynese McDaniel
(74) *Attorney, Agent, or Firm* — TechLaw LLP

(57) ABSTRACT

A device for compensating ripples in the output voltage of a PFC converter and a battery charging device for an electric vehicle are disclosed. The disclosed device for compensating the ripples included in the output voltage of a PFC converter includes: a first switching element having one end connected with an output terminal that is not connected with a ground from among two output terminals forming an output end of the PFC converter; a second switching element having one end connected with the other end of the first switching element and having the other end connected with a ground; a compensation inductor having one end connected with the other end of the first switching element and with one end of the second switching element; and a compensation capacitor having one end connected with the other end of the compensation inductor and having the other end connected with a ground.

5 Claims, 6 Drawing Sheets

(51) Int. Cl.
  *H02M 1/42*  (2007.01)
  *H02J 7/02*  (2016.01)

(52) U.S. Cl.
  CPC ............ *H02J 7/022* (2013.01); *H02M 1/4225* (2013.01); *Y02B 40/90* (2013.01); *Y02B 70/126* (2013.01); *Y02T 90/127* (2013.01)

(56) References Cited

U.S. PATENT DOCUMENTS

| | | | |
|---|---|---|---|
| 2008/0205095 A1* | 8/2008 | Pinon | H02M 3/1584 363/39 |
| 2008/0272744 A1* | 11/2008 | Melanson | H02M 1/4225 323/205 |
| 2009/0206902 A1* | 8/2009 | Li | H02M 1/4225 327/176 |
| 2011/0096576 A1* | 4/2011 | Takahashi | H02M 1/4225 363/44 |
| 2012/0153730 A1* | 6/2012 | Barnett | H02M 3/285 307/82 |
| 2013/0201729 A1* | 8/2013 | Ahsanuzzaman | H02M 3/33507 363/21.12 |
| 2013/0235631 A1* | 9/2013 | Pahlevaninezhad | H02M 1/42 363/126 |
| 2014/0368128 A1* | 12/2014 | Elferich | H02M 1/15 315/297 |
| 2015/0155772 A1* | 6/2015 | De Sousa | H02M 1/15 363/46 |

\* cited by examiner

DEVICE FOR COMPENSATING FOR RIPPLES OF OUTPUT VOLTAGE OF PFC CONVERTER AND BATTERY CHARGING DEVICE FOR ELECTRIC VEHICLE USING SAME

CROSS-REFERENCE TO RELATED APPLICATIONS

This application is a National Phase Application of PCT International Application No. PCT/KR2013/009747, which was filed on Oct. 30, 2013, and which claims priority from Korean Patent Application No. 10-2012-0122866 filed with the Korean Intellectual Property Office on Nov. 1, 2012. The disclosures of the above patent applications are incorporated herein by reference in their entirety.

BACKGROUND

1. Technical Field

Embodiments of the present invention relate to a device for compensating ripples in the output voltage of a PFC (power factor correction) converter and a battery charging device for an electric vehicle that uses such compensating device, which can reduce the ripple voltage in the output voltage of the PFC converter without using a high-capacitance electrolyte capacitor.

2. Description of the Related Art

A device for charging the battery of an electric vehicle (EV) generally uses commercial power. Thus, the battery charging device for an electric vehicle can be used for 110 $V_{ac}$ or 220 $V_{ac}$ and may require consideration of power factor correction. In order to allow charging for batteries of various specifications, the battery charging device for an electric vehicle may be required to provide a wide range of output, such as from 100 V to 500 V.

For this purpose, an electric vehicle battery charging device 100 is generally used that has a dual composition as illustrated in FIG. 1, including an AC/DC converter 110 for power factor correction (PFC), and a high-voltage link capacitor 120 for converting the varying power of AC voltage to a more stable DC power and a DC/DC converter 130 that uses a transformer for charge control.

FIG. 2 is a diagram illustrating the form of power within the conventional battery charging device 100 for an electric vehicle shown in FIG. 1.

Referring to FIG. 2, a conventional charging device 100 for an electric vehicle may rectify an AC input and may perform current control at the power factor correction terminal such that the current at the input side follows the rectified voltage, and in such cases, a PFC converter 400 such as that illustrated in FIG. 3 may be used. In such a case, fluctuating power may occur at the output end of the PFC converter 400, and a high-voltage DC link capacitor may be used for filtering. Then, the DC/DC converter, which uses a transformer for insulation, may charge the battery via current control by using the DC voltage formed at the AC/DC terminal.

However, the conventional electric vehicle charging device 100 described above has a complicated structure, due to its dual composition. Also, the conventional electric vehicle charging device 100 may require an electrolytic capacitor having a high capacitance of several thousand uF or higher and a high power density for filtering the fluctuating power, but since the lifespan of an electrolytic capacitor decreases rapidly at high temperatures, it is not suitable for applications requiring long lifespans, such as electric vehicles.

A method of using a film capacitor instead of an electrolyte capacitor can be considered as a solution, but a film capacitor has a much lower power density compared to an electrolyte capacitor and thus may not be suitable for a charger that is designed for high capacitance and requires high power density.

SUMMARY

To resolve the problems in the related art described above, an aspect of the invention proposes a device for compensating ripples in the output voltage of a PFC (power factor correction) converter and a battery charging device for an electric vehicle that uses such compensating device, which can reduce the ripple voltage in the output voltage of the PFC converter without using a high-capacitance electrolyte capacitor.

Other objectives of the invention can be derived by the skilled person from the embodiments described below.

To achieve the objective above, an embodiment of the invention provides a device for compensating the ripples included in the output voltage of a PFC converter equipped on a battery charging device for an electric vehicle, where the device includes: a first switching element having one end connected with an output terminal that is not connected with a ground from among two output terminals forming an output end of the PFC converter; a second switching element having one end connected with the other end of the first switching element and having the other end connected with a ground; a compensation inductor having one end connected with the other end of the first switching element and with one end of the second switching element; and a compensation capacitor having one end connected with the other end of the inductor and having the other end connected with a ground.

Another embodiment of the invention provides a battery charging device for an electric vehicle that includes: a PFC converter configured to perform a power factor correction for an input voltage; a link capacitor connected in parallel with an output end of the PFC converter; and a ripple compensation part for compensating ripples included in voltages at both ends of the link capacitor that is connected in parallel with the link capacitor, where the ripple compensation part includes: a first switching element having one end connected with one end of the link capacitor; a second switching element having one end connected with the other end of the first switching element and having the other end connected with a ground; a compensation inductor having one end connected with the other end of the first switching element and with one end of the second switching element; and a compensation capacitor having one end connected with the other end of the compensation inductor and having the other end connected with a ground.

According to certain embodiments of the invention, the ripple voltage occurring in the output voltage of a PFC (power factor correction) converter can be reduced, without having to use a high-capacitance electrolyte capacitor, in a charging device for an electric vehicle.

Additional aspects and advantages of the present invention will be set forth in part in the description which follows, and in part will be obvious from the description, or may be learned by practice of the invention.

DETAILED DESCRIPTION

Figure 1:
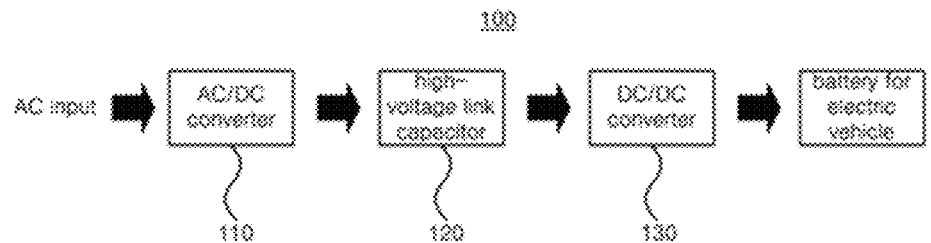
FIG. 1 is a block diagram illustrating the overall composition of a battery charging device for an electric vehicle according to the related art.
Figure 2:
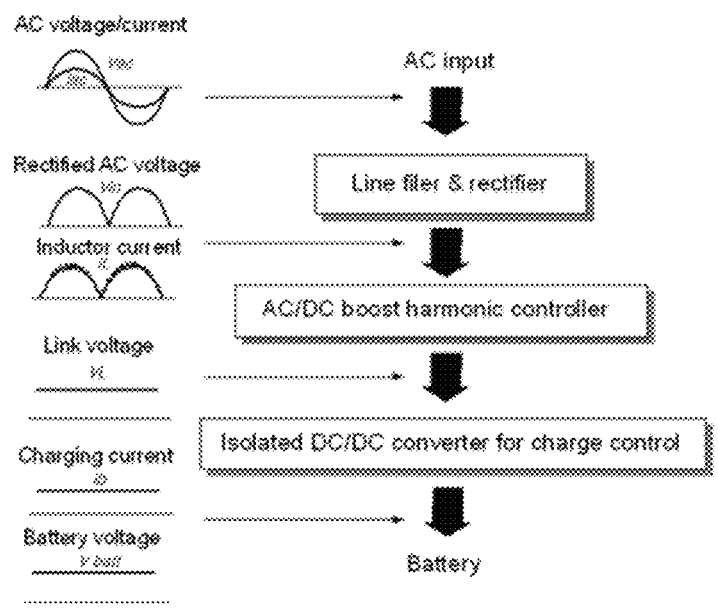
FIG. 2 is a diagram illustrating the flow of power in the battery charging device for an electric vehicle illustrated in FIG. 1.
Figure 3:
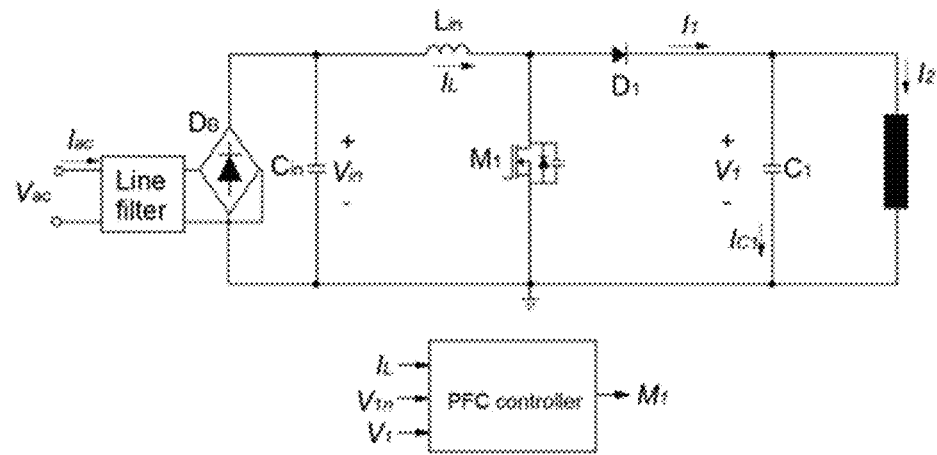
FIG. 3 is a diagram illustrating the composition of a PFC converter (AC/DC converter) in the battery charging device for an electric vehicle illustrated in FIG. 1.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like components.

When a component is mentioned to be "coupled" or "connected" to another component, this may mean that it is directly coupled or connected to the other component, but it is to be understood that yet another component may exist in-between. On the other hand, when a component is mentioned to be "directly coupled" or "directly connected" to another component, it is to be understood that there are no other components in-between.

Certain embodiments of the invention will be described below in more detail with reference to the accompanying drawings.

Figure 4A:
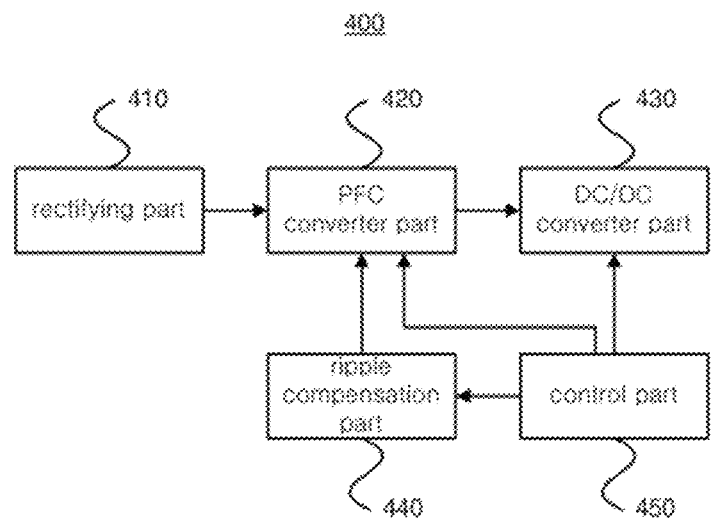
FIG. 4A and FIG. 4B are block diagrams illustrating the overall composition of a battery charging device for an electric vehicle according to an embodiment of the invention.
Figure 4B:
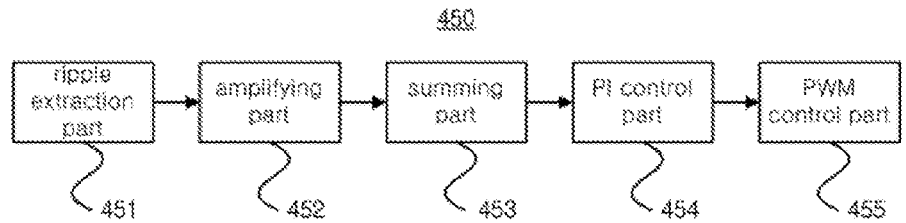
Figure 5:
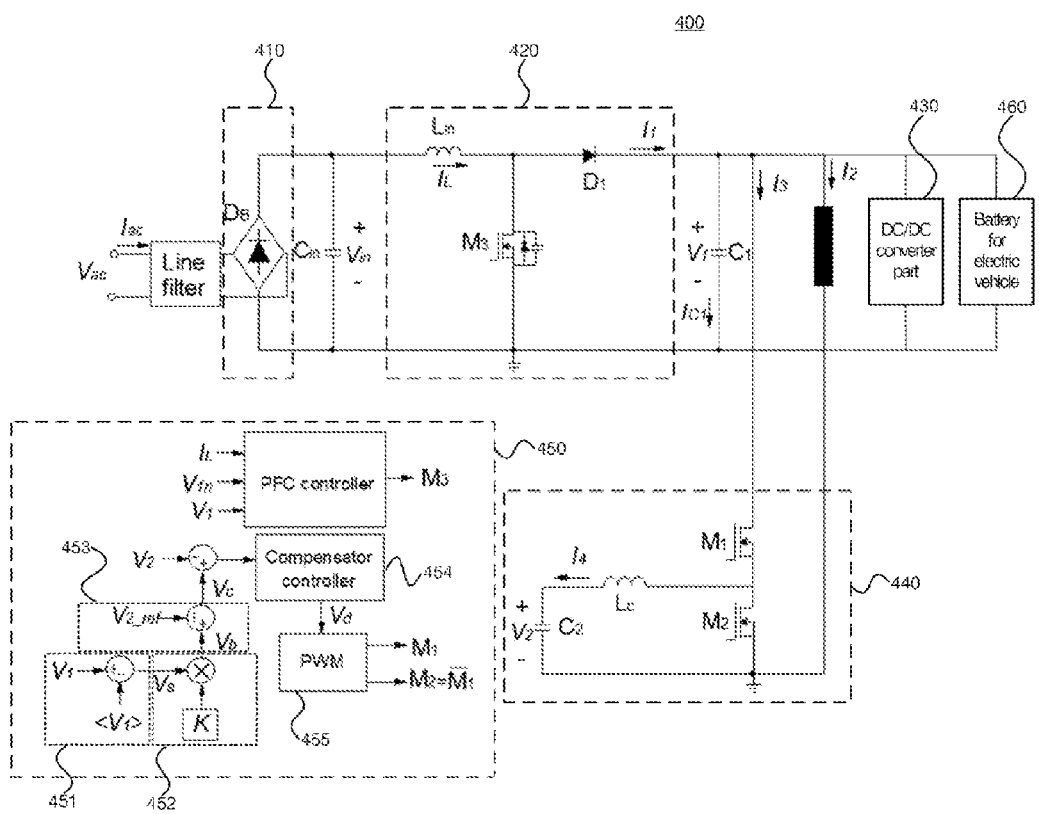
FIG. 5 is a circuit diagram illustrating the detailed composition of a battery charging device for an electric vehicle according to an embodiment of the invention.

FIG. 4A and FIG. 4B are block diagrams illustrating the overall composition of a battery charging device for an electric vehicle according to an embodiment of the invention, and FIG. 5 is a circuit diagram illustrating the detailed composition of a battery charging device for an electric vehicle according to an embodiment of the invention.

Referring to FIG. 4A, FIG. 4B, and FIG. 5, an electric vehicle charging device 400 according to an embodiment of the invention can include a rectifying part 410, PFC converter part 420, DC/DC converter part 430, ripple compensation part 440, and control part 450. The function of each component is described below in more detail.

The rectifying part 410 may apply half-wave or full-wave rectification on an alternating-current voltage ($V_{ac}$, hereinafter referred to as "input voltage") inputted from the outside.

Here, the input voltage ($V_{ac}$) can have a magnitude between 90 $V_{ac}$ and 260 $V_{ac}$. In one example, the inputted AC voltage can be a commercial AC voltage having a magnitude of 110 $V_{ac}$ or 220 $V_{ac}$.

According to an embodiment of the invention, the rectifying part 410 can be connected with an external power source and can include four diodes connected in a Full Bridge configuration.

Next, an input capacitor $C_{in}$ and the PFC converter part 420 may be connected sequentially at the output end of the rectifying part 410.

The PFC converter part 420 may be an AC/DC converter that receives the rectified input voltage and performs power factor correction to the applied voltage.

To be more specific, the PFC converter part 420 can include an input inductor $L_{in}$, a third switching element $M_3$, and a diode $D_1$ (the first switching element $M_1$ and second switching element $M_2$ are included in the ripple compensation part 440 described later on).

The input inductor $L_{in}$ may have one end connected with the output terminal that is not connected with a ground, from among the two output terminals forming the output end of the rectifying part 410, and may have the other end connected with the other end of the third switching element $M_3$ and one end (input end) of the diode $D_1$, while the third switching element $M_3$ may have its other end connected with a ground. Also, the other end (output end) of the diode $D_1$ may be used as an output terminal forming the output end of the PFC converter part 420, while the other output terminal forming the output end may be connected with a ground.

According to an embodiment of the invention, the third switching element $M_3$ can be switched on/off according to a particular period. In one example, the third switching element $M_3$ can be controlled based on the current ($I_L$) flowing through the input inductor $L_{in}$, the voltage ($V_{in}$) at both ends of the input capacitor $C_{in}$, and the voltage at both ends of the link capacitor $C_1$ described later on. Here, the on/off control of the third switching element $M_3$ can be performed by a control part 450 as described later on.

Continuing with the description, the link capacitor $C_1$ and the DC/DC converter part 430 may be connected sequentially at the output end of the PFC converter part 420.

The link capacitor $C_1$ may perform a function of transforming the power that varies according to AC voltage to a stable DC power. One end and the other end of this link capacitor $C_1$ may be connected with the two output terminals that form the output end of the PFC converter part 420. Also, the DC/DC converter 430 may apply a DC/DC conversion to the voltage outputted from the PFC converter part 420, and afterwards may use this to charge the electric vehicle battery 460.

Next, the ripple compensation part 440 may be connected in parallel with the DC/DC converter part 430 with respect to the PFC converter part 420, and may perform a function of compensating the ripple voltage included in the output voltage of the PFC converter part 420 (i.e. the voltage at both ends of the link capacitor $C_1$). For this purpose, the ripple compensation part 440 may include two switching elements $M_1$, $M_2$, a compensation inductor $L_C$ and a compensation capacitor $C_2$. A description is provided below of the connection relationships of each element included in the ripple compensation part 440.

First, the two switching elements $M_1$, $M_2$ may be connected in series with each other. To be more specific, one end of the first switching element $M_1$ may be connected with the output terminal that is not connected with a ground, from among the two output terminals forming the output end of the PFC converter 420, while the other end of the first switching element $M_1$ may be connected with one end of the second switching element $M_2$. The other end of the second switching element $M_2$ may be connected with a ground.

Next, the compensation inductor $L_C$ and the compensation capacitor $C_2$ may be connected in series with each other, and may be connected between the point at which the first switching element $M_1$ and second switching element $M_2$ are connected and the ground. In other words, one end of the compensation inductor $L_C$ may be connected with the other end of the first switching element $M_1$ and one end of the second switching element $M_2$, while the other end of the compensation inductor $L_C$ may be connected with one end of the compensation capacitor $C_2$, and the other end of the compensation capacitor $C_2$ may be connected with a ground.

The control part 450 may control the on/off states of the first switching element $M_1$, second switching element $M_2$, and third switching element $M_3$.

In particular, according to an embodiment of the invention, the control part 450 can control the on/off states of the first switching element $M_1$ and second switching element $M_2$ included in the ripple compensation part 440 according to a PI (proportional-integral) control method and a PWM (pulse width modulation) control method by using a first voltage measured at the output end of the PFC converter 420 (i.e. the voltage ($V_1$) at both ends of the link capacitor $C_1$) and a second voltage ($V_2$) measured at both ends of the compensation capacitor. For this, the control part 450 can include a ripple extraction part 451, an amplifying part 452, a summing part 453, a PI control part 454, and a PWM control part 455, as illustrated in FIG. 4A, FIG. 4B, and FIG. 5. The function of each component included in the control part 450 is described below with reference to FIG. 6.

First, the ripple extraction part 451 may extract the ripple voltage ($V_a$) included in the first voltage (i.e. the voltage ($V_1$) at both ends of the link capacitor $C_1$). More specifically, the ripple extraction part 451 can measure the first voltage ($V_1$) by sensing the output end of the PFC converter 420 to which the link capacitor $C_1$ is connected, and can extract the ripple voltage ($V_a$) by subtracting a predetermined DC component value ($<V_1>$) at the output end of the PFC converter 420 from the measured first voltage ($V_1$).

Next, the amplifying part 452 may amplify the extracted ripple voltage ($V_a$) by K times. Also, the summing part 453 may sum the amplified ripple voltage ($KV_a$) with the reference voltage ($V_{2\_ref}$) for the second voltage ($V_2$) to generate a command voltage ($V_C$).

Then, the PI control part 454 may output a control value for PI control (a PI control value) by using the command voltage ($V_C$) and the second voltage ($V_2$) measured by sensing at both ends of the compensation capacitor $C_2$. Here, the PI control value may be a signal for providing control such that the second voltage ($V_2$) approximates the command voltage ($V_C$). As the principles of PI control are well known to those skilled in the art, they will not be described here in further detail.

Finally, the PWM control part 455 may generate a PWM control value by using the PI control value. In one example, the PWM control part 455 can generate the PWM control value by comparing the PI control value with a reference signal having the form of a triangular wave or a sinusoidal wave. As the principles of PWM control are also well known to those skilled in the art, they will not be described here in further detail.

The PWM control value may be used in controlling the on/off states of the first switching element $M_1$ and the second switching element $M_2$. To be more specific, the first switching element $M_1$ and the second switching element $M_2$ can be controlled such that while the first switching element $M_1$ is on, the second switching element $M_2$ is off, and while the first switching element $M_1$ is off, the second switching element $M_2$ is on.

Figure 6:
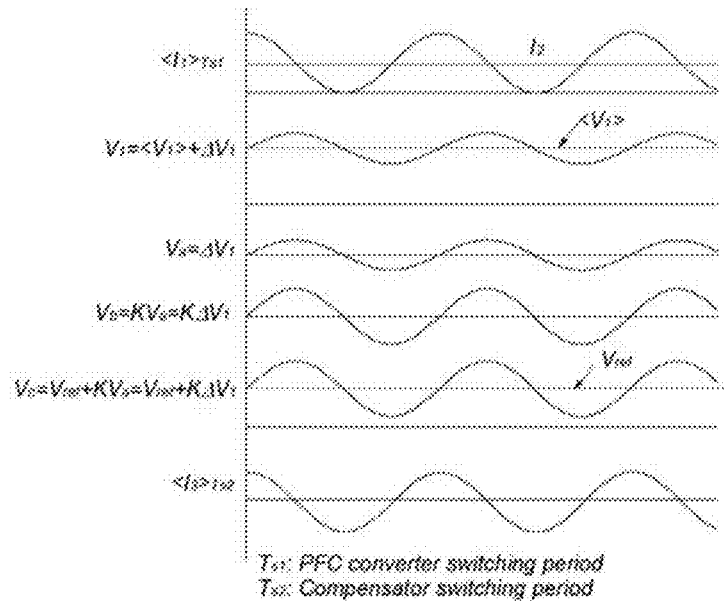
FIG. 6 is a diagram illustrating the functioning of a control part in a battery charging device for an electric vehicle according to an embodiment of the invention.

As a result of such control the average of one period of the output current of the ripple compensation part 440 can be made equal to that of the waveform shown in the lowermost graph of FIG. 6. That is, when the link capacitor $C_1$ is being charged, the second switching element $M_2$ may be turned on, so that a surplus current greater than the load current flows to the ripple compensation part 440 and slowly charges the link capacitor $C_1$, and when the link capacitor $C_1$ is being discharged, the first switching element $M_1$ may be turned on, so that the current flows to the link capacitor $C_1$ and slowly discharges the link capacitor $C_1$.

Figure 7:
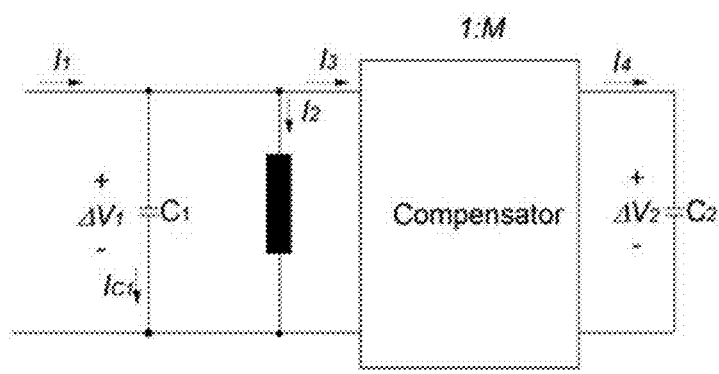
FIG. 7 and FIG. 8 are diagrams illustrating an equivalent circuit adjacent to the ripple compensation part in a battery charging device for an electric vehicle according to an embodiment of the invention.
Figure 8:
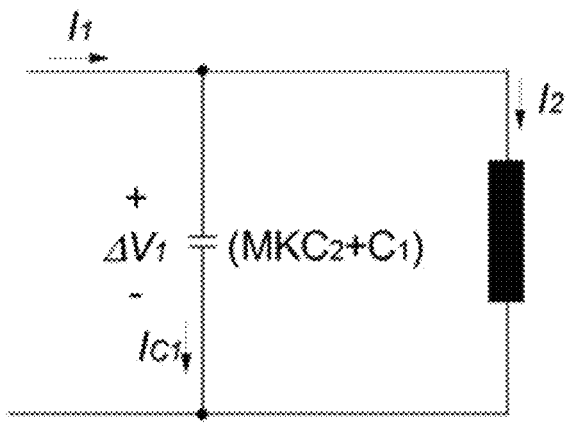

This operation can be more clearly understood by referring to the equivalent circuit illustrated in FIG. 7 and FIG. 8.

FIG. 7 and FIG. 8 are diagrams illustrating an equivalent circuit adjacent to the ripple compensation part 440 in an electric vehicle battery charging device 400 according to an embodiment of the invention.

First, referring to FIG. 7, the current ($I_{C1}$) flowing through the link capacitor $C_1$ corresponds to the output current ($I_1$) subtracted by the current ($I_2$) flowing to a load and the current ($I_3$) flowing to the ripple compensation part 440, as shown in Equation 1 shown below.

$$I_{C_1} = I_1 - I_2 - I_3 \qquad \text{[Equation 1]}$$

Here, if the input/output gain of the ripple compensation part 440 is given as M, then Equation 1 above can be modified to Equation 2 shown below.

$$I_{C_1} = I_1 - I_2 - MI_3 \qquad \text{[Equation 2]}$$

Meanwhile, the relationship between the current flowing to the link capacitor $C_1$ and the ripple voltage ($V_a$ or $\Delta V_1$) included in the voltage ($V_1$) at the output end of the PFC converter 420 can be expressed as Equation 3 shown below.

$$I_{C_1} = C_1 \frac{d\Delta V_1}{dt} \qquad \text{[Equation 3]}$$

Also, the relationship between the change ($\Delta V_2$) in voltage ($V_2$) at both ends of the compensation capacitor $C_2$ and the output current ($I_4$) of the ripple compensation part 440 can be expressed as Equation 4 shown below.

$$I_4 = C_2 \frac{dV_2}{dt} \qquad \text{[Equation 4]}$$

Here, since the change ($\Delta V_2$) in voltage ($V_2$) at both ends of the compensation capacitor $C_2$ is controlled to approximate $K\Delta V_1$, Equation 4 can be expressed as Equation 5 shown below.

$$I_4 = C_2 \frac{d K \Delta V_1}{dt} \quad \text{[Equation 5]}$$

Using Equation 1 through Equation 5, the following Equation 6 can be derived, and this can be expressed as an equivalent circuit as in FIG. 7.

$$I_1 - I_2 = (M K C_2 + C_1) \frac{d \Delta V_1}{dt} \quad \text{[Equation 6]}$$

That is, when the ripple compensation part 440 is used, the capacitance of the link capacitor $C_1$ connected to the output end of the PFC converter part 420 may be effectively increased from $C_1$ to $MKC_2$.

For example, if the capacitance of the link capacitor $C_1$ is 110 uF, the capacitance of the compensation capacitor $C_2$ is 220 uF, the average voltage of the ripple compensation part 440 is 200V, and K has a value of 15, then the gain (M) of the ripple compensation part 440 would be 0.5, so that the effective capacitance would be 0.5×15×220 uF+100 uF=1760 uF. In other words, even with a link capacitor $C_1$ of 330 uF, the same ripple voltage can be obtained as if a link capacitor $C_1$ of 1760 uF were used.

Thus, according to an embodiment of the invention, the effect of reducing the ripple voltage that occurs in the output voltage of the PFC converter part 420 can be obtained even with a film capacitor having a low capacitance instead of a high-capacitance electrolyte capacitor.

Figure 9:
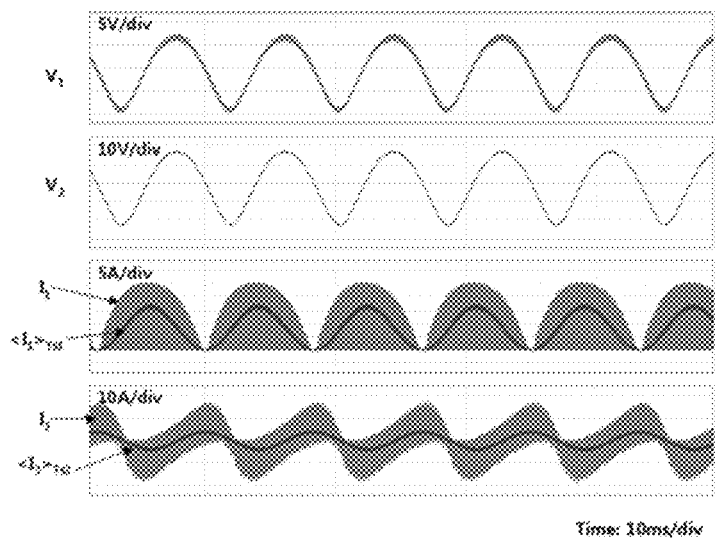
FIG. 9, FIG. 10, and FIG. 11 are graphs for verifying the validity of a ripple compensation part according to an embodiment of the invention.
Figure 10:
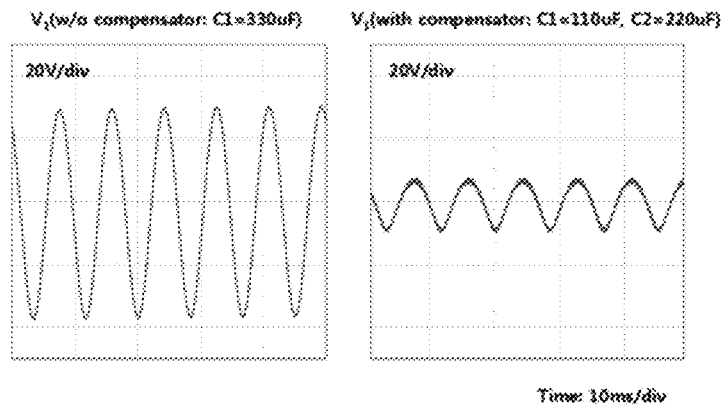
Figure 11:
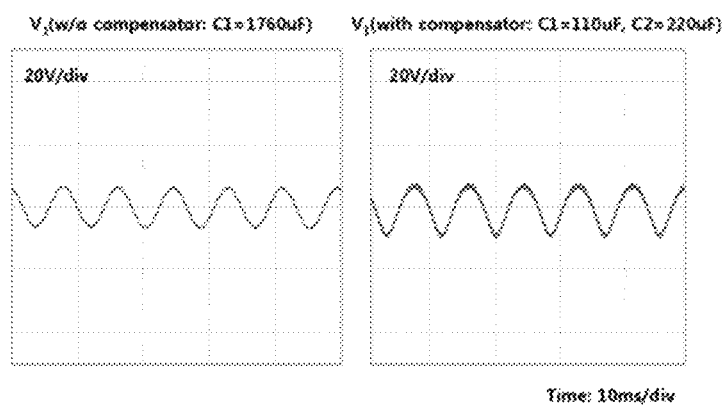

FIG. 9 through FIG. 11 are graphs for verifying the validity of a ripple compensation part 450 according to an embodiment of the invention.

In the circuits of FIG. 5 and FIG. 7, an output power of 3300 W (output voltage=400V) was used, a capacitance of 110 uF was used for the of the link capacitor $C_1$, a capacitance of 220 uF was used for the compensation capacitor $C_2$, and an amplifier gain (K) of 15 was used for the ripple compensation part 440.

Referring to FIG. 9, it can be seen that the output current of the ripple compensation part 440 is operating properly towards suppressing ripples that occur in the voltage ($V_1$) at both ends of the link capacitor $C_1$.

FIG. 10 and FIG. 11 show waveforms that compare the voltage ($V_1$) at the output end of the PFC converter part 420 according to whether a ripple compensation part 440 is present or not.

In FIG. 10, the capacitance of the link capacitor $C_1$ for the case in which the ripple compensation part 440 is not included is set to 330 uF, equal to the sum of the capacitances of the link capacitor $C_1$ and the compensation capacitor $C_2$ for the case in which the ripple compensation part 440 is included. Also, in FIG. 11, the capacitance of the link capacitor $C_1$ for the case in which the ripple compensation part 440 is not included is set to 1760 uF, while the sum of the capacitances of the link capacitor $C_1$ and the compensation capacitor $C_2$ for the case in which the ripple compensation part 440 is included is set to 330 uF.

Referring to FIG. 10, for the case in which the ripple compensation part 440 is not present, the voltage ($V_1$) at the output end of the PFC converter part 420 varied from 365V to 432V (i.e. a ripple voltage of 67V occurred, as seen in the left graph of FIG. 10), whereas for the case in which a ripple compensation part 440 is used, the voltage ($V_1$) at the output end of the PFC converter part 420 varied from 391V to 407V (i.e. a ripple voltage of 16V occurred), showing a decrease in the ripple voltage.

Also, referring to FIG. 11, it can be observed that by using the ripple compensation part 440, the same ripple reduction effect that is obtained when using a link capacitor $C_1$ of 1760 uF can be obtained with a total capacitance of just 330 uF.

While the present invention has been described above using particular examples, including specific components, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A device for compensating ripples included in an output voltage of a PFC converter equipped on a battery charging device for an electric vehicle, the device comprising:
    a first switching element having a first end and a second end, the first end of the first switching element being connected with an output terminal that is not connected with a ground from among two output terminals forming an output end of the PFC converter;
    a second switching element having a first end and a second end, the first end of the second switching element being connected with the second end of the first switching element and the second end of the second switching element being connected with a ground;
    a compensation inductor having a first end and a second end, the first end of the compensation inductor being connected with the second end of the first switching element and with the first end of the second switching element;
    a compensation capacitor having a first end and a second end, the first end of the compensation capacitor being connected with the second end of the compensation inductor and the second end of the compensation capacitor being connected with a ground; and
    a control part for controlling an on/off state of the first switching element and an on/off state of the second switching element by using a first voltage and a second voltage, the first voltage measured at an output end of the PFC converter, the second voltage measured at both the first and second ends of the compensation capacitor;
    wherein the control part comprises:
        a ripple extraction part configured to extract a ripple voltage included in the first voltage;
        an amplifying part configured to amplify the extracted ripple voltage;
        a summing part configured to generate a command voltage by summing the amplified ripple voltage with a reference voltage for the second voltage;
        a PI control part configured to generate a PI control value by using the command voltage and the second voltage; and
        a PWM control part configured to generate a PWM control value by using the PI control value.

2. The device of claim 1, wherein the on/off state of the first switching element and the on/off state of the second switching element are controlled by the PWM control value, and the second switching element is off while the first switching element is on, and the second switching element is on while the first switching element is off.

3. A battery charging device for an electric vehicle, the battery charging device comprising:
- a PFC converter configured to perform a power factor correction for an input voltage;
- a link capacitor connected in parallel with an output end of the PFC converter; and
- a ripple compensation part for compensating ripples included in voltages at both ends of the link capacitor, the ripple compensation part connected in parallel with the link capacitor, wherein the ripple compensation part comprises:

a first switching element having a first end and a second end, the first end of the first switching element being connected with one end of the link capacitor;

a second switching element having a first end and a second end, the first end of the second switching element being connected with the second end of the first switching element and the second end of the compensation capacitor being connected with a ground;

a compensation inductor having a first end and a second end, the first end of the compensation inductor being connected with the second end of the first switching element and with the first end of the second switching element;

a compensation capacitor having a first end and a second end, the first end of the compensation capacitor being connected with the second end of the compensation inductor and the second end of the compensation capacitor being connected with a ground; and a control part for controlling an on/off state of the first switching element and an on/off state of the second switching element by using a first voltage and a second voltage, the first voltage measured at an output end of the PFC converter, the second voltage measured at both the first and second ends of the compensation capacitor;

wherein the control part comprises:
- a ripple extraction part configured to extract a ripple voltage included in the first voltage;
- an amplifying part configured to amplify the extracted ripple voltage;
- a summing part configured to generate a command voltage by summing the amplified ripple voltage with a reference voltage for the second voltage;
- a PI control part configured to generate a PI control value by using the command voltage and the second voltage; and
- a PWM control part configured to generate a PWM control value by using the PI control value.

4. The battery charging device of claim 3, wherein the on/off state of the first switching element is controlled by the PWM control value, and the second switching element is off while the first switching element is on, and the second switching element is on while the first switching element is off.

5. The battery charging device of claim 3, further comprising:
- a rectifying part configured to rectify the input voltage, and the PFC converter comprises an input inductor having a first end and a second end, the first end of the input inductor being connected with an output terminal that is not connected with a ground from among two output terminals forming an output end of the rectifying part; a third switching element having a first end and a second end, the first end of the third switching element being connected with the second end of the input inductor and the second end of the third switching element being connected with a ground; and a diode having one end thereof connected with the second end of the input inductor and with one end of the third switching element.

* * * * *